(No Model.)

G. E. BURNHAM.
REIN SUPPORT.

No. 583,842. Patented June 1, 1897.

WITNESSES
F. B. Berry.
J. E. Tappan

INVENTOR
George E. Burnham
by John Wedderburn
Attorney

UNITED STATES PATENT OFFICE.

GEORGE E. BURNHAM, OF MINNEAPOLIS, KANSAS.

REIN-SUPPORT.

SPECIFICATION forming part of Letters Patent No. 583,842, dated June 1, 1897.

Application filed August 26, 1896. Serial No. 604,000. (No model.)

*To all whom it may concern:*

Be it known that I, GEORGE E. BURNHAM, a citizen of the United States, residing at Minneapolis, in the county of Ottawa and State of Kansas, have invented certain new and useful Improvements in Harness Attachments; and I do hereby declare the following to be a full, clear, and exact description of the invention, such as will enable others skilled in the art to which it appertains to make and use the same.

My invention relates to improvements in harness attachments, and has more particular relation to rein holders and guards.

This invention consists of certain novel constructions, combinations, and arrangements of parts, all of which will be hereinafter more fully described and claimed.

Figure 1:
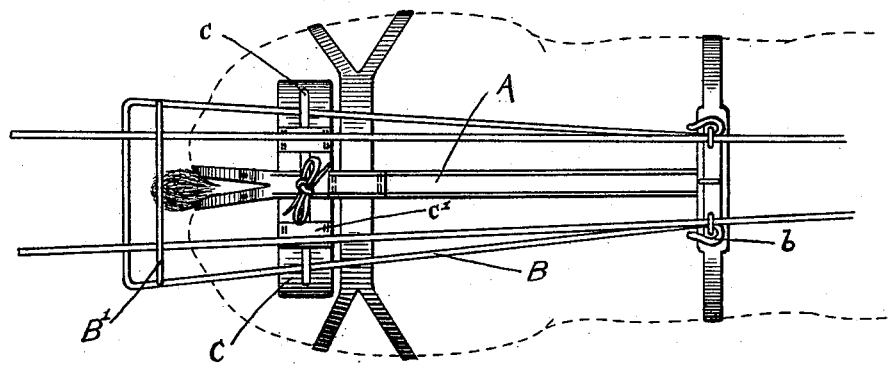
Figure 2:
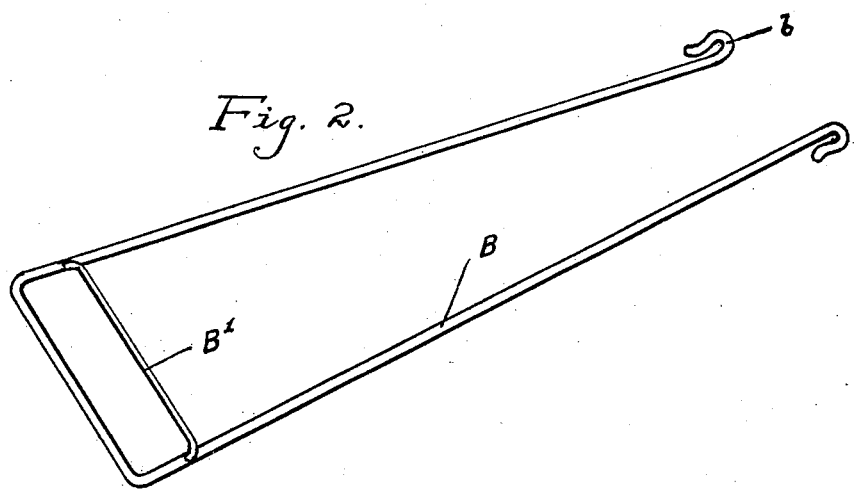
Figure 3:
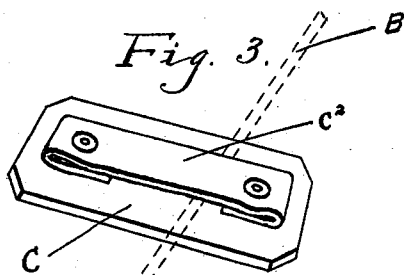

In the accompanying drawings, forming part of this specification, Figure 1 represents a top plan view of the device embodying my invention as applied to a horse, the latter being shown in dotted lines. Fig. 2 represents a detail perspective view of the rein-supporting frame, and Fig. 3 represents a detail perspective view of a modified form of supporting-piece for the rein-supporter.

A in the drawings represents the back-strap of the harness proper, B my improved rein-support, and C the supporting-piece for the same.

My improved support B comprises a wire bent to form a loop and provided at each end with a hook $b$, said hooks being adapted to be passed around the terrets below the rings or through the rein-rings on the back-strap of the harness. The rear portion of the loop-support B is provided with a cross-loop B', that extends upwardly from the same. The said support B is supported at the rear by supporting-piece C. The said support is attached to this supporting-piece either by straps and buckles, sewing, or by lacing or riveting.

In Fig. 1 of the drawings I have shown it secured to said supporting-piece by means of a leather lace $c$, said lace being passed through the supporting-piece and cross-strips $c'$, attached to the upper surface of the same, the lace being tied in a knot above.

In the construction shown in Fig. 3 I have illustrated the wires of the support as passing through loops $c^2$, riveted to said supporting-piece. This supporting-piece in each case is adapted to rest upon the back of the horse, just forward of the crupper, and forms a firm support for the rear portion of the supporting-frame. When the said supporting-frame B is in position, it extends about six inches to the rear of the crupper, and when the reins are passed under the loop B' and over the loop proper they are held out of the way of the horse's tail, and he cannot get the lines down from this position by throwing his tail over the same, as the wire support would cause it to slide off without catching upon the reins.

It will be observed from the foregoing that it is not necessary to in any way alter the arrangements of a harness in order to apply my invention thereto, it only being necessary to hook the hooked ends of the support around the terrets below the rein-rings or into the rein-rings and to pass the back-strap of the harness through the loop formed upon the supporting-piece. By this latter operation of passing the back-strap through the loop of the supporting-piece said supporting-piece is held firmly in its position upon the back of the horse and cannot slip from side to side.

Having thus fully described my invention, what I claim as new, and desire to secure by Letters Patent, is—

1. A rein-support comprising a frame adapted to be attached to the harness and extending to the rear of the crupper for supporting the reins and preventing the horse from throwing his tail over the same, and a support for said support provided with suitable loops through which the wires of said support and a portion of the harness-straps are passed, substantially as described.

2. A rein-support comprising a wire bent into a loop and having a hook at each end adapted to hook to the terrets or rein-rings of the harness, an additional loop on the looped end of said support, and a supporting-piece for said support attached to the same and to a portion of the harness to prevent its slipping from side to side, the construction being such that the looped end of the support extends some distance to the rear of the crupper for supporting the reins and preventing the horse from throwing his tail over the same, substantially as described.

In testimony whereof I have signed this specification in the presence of two subscribing witnesses.

GEORGE E. BURNHAM.

Witnesses:
T. HUNTSINGER,
F. L. BENJAMIN.